United States Patent
Merten (10) Patent No.: US 11,926,487 B2
(45) Date of Patent: Mar. 12, 2024

(54) APPARATUS AND METHOD FOR FEEDING TRANSPORT POCKETS INTO A CONVEYING SYSTEM OF A HANGING CONVEYING INSTALLATION, AND THE HANGING CONVEYING INSTALLATION

(71) Applicant: Dürkopp Fördertechnik GmbH, Bielefeld (DE)

(72) Inventor: Markus Merten, Bielefeld (DE)

(73) Assignee: Dürkopp Fördertechnik GmbH, Bielefeld (DE)

( * ) Notice: Subject to any disclaimer, the term of this patent is extended or adjusted under 35 U.S.C. 154(b) by 82 days.

(21) Appl. No.: 17/529,959

(22) Filed: Nov. 18, 2021

(65) Prior Publication Data

US 2022/0153533 A1   May 19, 2022

(30) Foreign Application Priority Data

Nov. 19, 2020   (DE) ...................... 10 2020 214 613.6

(51) Int. Cl.
*B65G 47/61*   (2006.01)
*B65G 17/20*   (2006.01)

(52) U.S. Cl.
CPC ............. *B65G 47/61* (2013.01); *B65G 17/20* (2013.01); *B65G 2201/0229* (2013.01)

(58) Field of Classification Search
None
See application file for complete search history.

(56) References Cited

U.S. PATENT DOCUMENTS

| | | |
|---|---|---|
| 5,072,822 A | 12/1991 | Smith |
| 5,897,004 A | 4/1999 | Neugebauer et al. |
| 5,975,279 A | 11/1999 | Blattner et al. |
| 8,408,380 B2 | 4/2013 | Doane |
| 8,561,787 B2 | 10/2013 | Wend et al. |
| 8,672,118 B2 | 3/2014 | Janzen et al. |
| 9,027,734 B2 * | 5/2015 | Wend ...................... B65G 47/29 198/459.6 |
| 9,199,796 B2 * | 12/2015 | Fenile .................. B65G 47/908 |

(Continued)

FOREIGN PATENT DOCUMENTS

| | | |
|---|---|---|
| CH | 714004 A1 | 1/2019 |
| DE | 9003011 U1 | 7/1991 |

(Continued)

OTHER PUBLICATIONS

Arnold et al., Handbuch Logistik, 2002, pp. 613-616—Section C2, Springer-Verlag Berlin Heidelberg, ISBN 978-3-540-72928-0.

*Primary Examiner* — Kavel Singh
(74) *Attorney, Agent, or Firm* — McGlew and Tuttle, P.C.

(57) ABSTRACT

An apparatus for feeding transport pockets into a conveying system of a hanging conveying installation includes a conveying rail which can be coupled conveyingly to the conveying system, along which the transport pockets can each be conveyed while being hanging by a hanging adapter, a detection unit for detecting the quantity of hanging adapters arranged within a detection zone on the conveying rail, a control unit which is in signal communication with the detection unit and is configured to variably set a transport spacing for conveying the transport pockets by the conveying system, a singularizing unit which is in signal communication with the control unit and is intended for singularized feeding the hanging adapters into the conveying system with the variably set transport spacing.

16 Claims, 4 Drawing Sheets

(56) References Cited

U.S. PATENT DOCUMENTS

| | | | |
|---|---|---|---|
| 9,427,907 B2 | 8/2016 | Van Hamme et al. | |
| 9,440,791 B2 | 9/2016 | Wend | |
| 9,815,635 B2 | 11/2017 | Sieksmeier et al. | |
| 10,112,783 B2 | 10/2018 | Stauber | |
| 10,532,841 B2 | 1/2020 | Yamagata et al. | |
| 10,647,523 B2 * | 5/2020 | Sigrist | B65G 9/004 |
| 11,180,322 B2 * | 11/2021 | Gallati | B65G 19/025 |
| 11,383,938 B2 * | 7/2022 | Merten | B65G 47/61 |
| 2009/0065330 A1 | 3/2009 | Lupton et al. | |
| 2013/0264171 A1 | 10/2013 | Wend et al. | |
| 2015/0274425 A1 | 10/2015 | Wend | |
| 2018/0118471 A1 | 5/2018 | Stauber | |
| 2019/0291968 A1 | 9/2019 | Gallati et al. | |

FOREIGN PATENT DOCUMENTS

| | | |
|---|---|---|
| DE | 29500802 U1 | 3/1995 |
| DE | 29906532 U1 | 8/1999 |
| DE | 10 2005 006 455 A1 | 8/2006 |
| DE | 102007025553 A1 | 12/2008 |
| DE | 102010010107 A1 | 9/2011 |
| DE | 102011104511 B3 | 10/2012 |
| DE | 102011101987 A1 | 11/2012 |
| DE | 102011116086 A1 | 4/2013 |
| DE | 102011118303 A1 | 5/2013 |
| DE | 102014201301 A1 | 7/2015 |
| DE | 102014203239 A1 | 8/2015 |
| DE | 102016110898 B3 | 6/2017 |
| DE | 102016208866 A1 | 11/2017 |
| DE | 102019215304 B3 | 8/2020 |
| EP | 0765826 A1 | 4/1997 |
| EP | 0780327 A1 | 4/1997 |
| EP | 1 690 811 A1 | 8/2006 |
| EP | 2196415 A2 | 6/2010 |
| EP | 2363358 A2 | 9/2011 |
| EP | 2899144 A1 | 7/2015 |
| EP | 3395451 A1 | 10/2018 |
| EP | 3543181 A1 | 9/2019 |

* cited by examiner

Fig. 4

APPARATUS AND METHOD FOR FEEDING TRANSPORT POCKETS INTO A CONVEYING SYSTEM OF A HANGING CONVEYING INSTALLATION, AND THE HANGING CONVEYING INSTALLATION

REFERENCES TO RELATED APPLICATIONS

This application claims the priority of German Patent Application, Serial No. 10 2020 214 613.6, filed Nov. 19, 2020, the content of which is incorporated herein by reference in its entirety as if fully set forth herein.

FIELD OF THE INVENTION

The invention relates to an apparatus and a method for feeding transport pockets into a conveying system of a hanging conveying installation, and to the hanging conveying installation.

BACKGROUND OF THE INVENTION

DE 10 2019 215 304 B3 discloses a hanging conveying installation with an apparatus for feeding hanging conveyable articles into the hanging conveying installation. By means of a detection unit, the respective thickness of individual hanging conveyable articles is determined. The hanging conveyable articles are fed singularized by a feeding unit and into a conveying system of the hanging conveying installation with a variably settable transport spacing depending on the detected thickness. The detection of the thickness of the individual hanging conveyable articles is elaborate and complex.

SUMMARY OF THE INVENTION

It is an object of the present invention to provide undisturbed conveying of transport pockets in a hanging conveying installation with the greatest possible performance efficiency at low effort in an uncomplicated manner.

According to the invention, this object is achieved by an apparatus for feeding transport pockets into a conveying system of a hanging conveying installation comprising a conveying rail which can be coupled conveyingly to the conveying system and along which the transport pockets can each be conveyed hanging by means of a hanging adapter, a detection unit for detecting the quantity of hanging adapters arranged within a detection zone on the conveying rail, a control unit which is in signal communication with the detection unit and is configured to variably set a transport spacing for conveying the transport pockets by means of the conveying system, a singularizing unit, which is in signal communication with the control unit, for singularized feeding of the hanging adapters into the conveying system at the variably set transport spacing.

This object is further achieved by a hanging conveying installation comprising the apparatus and a conveying system connected to the apparatus for conveying the hanging adapters.

This object is further achieved by a method for feeding transport pockets into a conveying system of a hanging conveying installation, comprising the method steps of conveying hanging adapters while being hanging, each carrying a transport pocket, along a conveying rail which can be coupled conveyingly to the conveying system, detecting the quantity of hanging adapters, arranged within a detection zone on the conveying rail, by means of a detection unit, variable setting a transport spacing for conveying the transport pockets with the conveying system by means of a control unit in signal communication with the detection unit, and singularized feeding of the hanging adapters into the conveying system with the variably set transport spacing by means of a singularizing unit which is in signal communication with the control unit.

According to the invention, it has been recognized that it is not necessary to determine the thickness of transport pockets in order to nevertheless variably set a transport spacing for a conveying system of a hanging conveying installation. Instead, it has been found that in order to variably set the transport spacing for conveying the transport pockets by means of the conveying system, it is sufficient to detect the quantity of hanging adapters arranged within a detection zone on a conveying rail of an apparatus for feeding the transport pockets into the conveying system. The hanging adapters each serve for conveying a transport pocket while being hanging in the apparatus and in the conveying system of the hanging conveying installation. The transport pockets can be conveyed from the apparatus, in particular from the conveying rail, directly into the conveying system. For this purpose, the conveying rail is designed such that it can be coupled conveyingly to the conveying system. Along the conveying rail, the hanging adapters are conveyed while being hanging. This may take place, for example, due to gravitation force, in that the conveying rail is arranged at an inclination in relation to the horizontal with an angle of inclination different from zero. The angle of inclination is in particular at most 25°, in particular at most 20°, in particular at most 15°, in particular between 1° and 12° and in particular between 1° and 10°.

In particular, the conveying system has a fixed drive for transporting the hanging adapters and thus the transport pockets.

A detection unit, which is in signal communication with a control unit, serves to detect the quantity of hanging adapters in the detection zone. The signal communication may be wired or wireless, in particular take place by means of radio technology. The control unit is configured to variably set the transport spacing for conveying the transport pockets by means of the conveying system. The transport spacing is in particular a minimum transport spacing. In particular, the transport spacing is set depending on the quantity of hanging adapters. In particular, a mean spacing between adjacent hanging adapters is calculated from the quantity of hanging adapters.

In particular, it has thus been found that it is not necessary for the variable setting of the transport spacing to determine each individual spacing of adjacent hanging adapters separately. In particular, it is sufficient if the total quantity of hanging adapters in the detection zone is determined, in particular counted, and a mean spacing for the hanging adapters arranged in the detection zone and accumulated in the detection zone is determined from the quantity of hanging adapters and an accumulation length of the hanging adapters in the detection zone.

A singularizing unit is in signal communication with the control unit, which serves to feed the hanging adapters individually into the conveying system. The signal communication between the control unit and the singularizing unit may be wired or wireless.

According to one aspect of the invention, the conveying rail may have a continuously differentiable course along the conveying direction. In particular, the transition region to the section of the conveying rail which is designed for conveying the hanging adapters by gravitation force, in particular is oriented at an inclination in relation to the horizontal, may have a continuously differentiable course, in particular be designed kinkless.

The conveying rail and/or the at least one hanging adapter preferably comprise a metal, in particular aluminum and/or steel, in particular they consist thereof.

A detection sensor enables an advantageous, in particular contactless, detection of the hanging adapters. The contactless detection of the hanging adapter enables a collision-free and fast detection of the adapters. An impairment of the conveying process is thus avoided. The detection sensors and in particular the detection unit increase the reliability and efficiency of the hanging conveying installation. A detection sensor is in particular arranged in the region of the conveying rail, in particular fastened to the conveying rail. In particular, the detection sensor is axially fastened in the longitudinal direction of the conveying rail. It may be advantageous to axially variably fasten the detection sensor in relation to the conveying rail. In particular, the detection sensor defines the detection zone on the conveying rail. In particular, the detection sensor is arranged relative to the conveying rail such that the detection sensor may directly detect the hanging adapters conveyed along the conveying rail.

Generally, the at least one detection sensor may be configured to detect at least one hanging adapter and/or at least one transport means, in particular at least one transport pocket. The hanging adapter is preferably a roller adapter. The detection of the hanging adapter may take place in a particularly robust and reliable manner, in particular due to its known geometry and/or its defined mounting on the conveying rail.

An embodiment of a detection sensor designed as an optical sensor, in particular as a light barrier, or as an RFID sensor has proven to be particularly advantageous. An optical sensor, in particular in the form of a light barrier, is of uncomplicated design. Since it has been recognized that it is sufficient to determine the presence of a hanging adapter, the embodiment of the detection sensor as an optical sensor, in particular as a light barrier, is sufficient. In particular, a light barrier comprises an emitting element and a receiving element. The emitting element emits an optical signal which is received by the corresponding receiving element. In this case, there is no hanging adapter between the emitting element and the receiving element. If no optical signal is received, this means that an object, i.e. a hanging adapter, is arranged between the emitting element and the receiving element. The emitting element and the corresponding receiving element are arranged on both sides below the conveying rail. A light spreading direction of the optical signal of the emitting element is oriented transversely and, in particular, perpendicularly to the conveying direction of the hanging adapters. Hanging adapters that are conveyed along the conveying rail must pass through the optical signal of the light barrier, that is, cross it. This reliably ensures that each hanging adapter is detected by a detection sensor.

Alternatively, the light barriers may also be designed as reflection light barriers. In this case, each detection sensor has an emitting/receiving element and a corresponding reflection element. The emitting/receiving element emits an optical signal to the reflection element, which is reflected by the latter back to the emitting/receiving element. In this case, there is no object, i.e. no hanging adapter, between the elements of the reflection light barrier. If no reflected-back signal is detected at the emitting/receiving element, an object, in particular a hanging adapter, is located between the components of the reflection light barrier.

In principle, other sensors, in particular optical sensors, are also possible which are suitable for determining the quantity and, in particular, the position of the hanging adapters in the detection zone. In particular, the at least one detection sensor may also be implemented as a line scan camera with a CCD, CMOS, NMOS or InGaAs sensor. In particular, the line scan camera is configured such that it has a width corresponding to the width of the detection zone. In particular, it may thus be sufficient to only use one single sensor. Instead of the line scan camera, an area scan camera may also be used.

Alternatively, the detection sensor may be designed as an RFID sensor which can communicate in particular with the hanging adapter, in particular with an RFID chip arranged in and/or integrated on the hanging adapter. In such an embodiment, in addition to the quantity of adapters, further data of the hanging adapter and in particular of the transport pocket conveyed while hanging on the hanging adapter may be detected. In particular, it is conceivable that the data stored in the hanging adapter also contain data relating to the transport pocket, in particular to the conveyable articles conveyed in the transport pocket. In particular, it is conceivable that conclusions can be drawn about a thickness of the transport pocket from the data relating to the conveyable articles. This data may be used for verification when detecting the transport spacing. Alternatively, it is possible to set the transport spacing on the basis of the data of the conveyable articles in the transport pocket, in particular a maximum possible thickness of the conveyable articles in the transport pocket. For example, the maximum possible thickness is understood to mean the largest dimension in the case of a cuboid-shaped package. In the case of a spherical package, the maximum dimension is the diameter of the sphere.

Alternatively, the detection sensor may be an inductive and/or capacitive proximity sensor.

In principle, the at least one detection sensor may be designed as a contacting sensor. The detection sensor may, for example, be designed as a switch, in particular as a pushbutton. For contacting detection of a hanging adapter, the detection sensor may be arranged on the conveying rail in such a way that the respective hanging adapter can be detected in a contacting manner, in particular individually. Preferably, switching the at least one detection sensor takes place by a contact with the hanging adapter, in particular due to an electrical connection established thereby and/or due to a relative movement between the hanging adapter and the detection sensor.

The at least one detection sensor may also be designed as to be an acoustic sensor, in particular as a microphone, in particular for detecting running noises of the hanging adapter.

A plurality of detection sensors arranged along the conveying rail in a line grid pattern enable direct detection of the quantity of hanging adapters in the detection zone. In particular, at least two, in particular at least three, in particular at least four, in particular at least six, in particular at least eight, in particular at least ten, in particular at least fifteen, and in particular up to one hundred detection sensors are provided. The detection sensors are arranged side by side along the conveying rail, in particular in a line grid pattern. The line grid is oriented in particular to be parallel to a conveying direction predetermined by the conveying rail. The length of the line grid along the conveying direction determines the size, in particular the width, of the detection zone along the conveying direction. In particular, the detection sensors are arranged in the line grid with, in particular identical, grid spacings from one another. In particular, the grid spacings are determined in such a way that a hanging adapter arranged on the conveying rail within the detection zone is detected without error by one of the detection sensors. The detection sensors are in particular designed as light barriers. The detection sensors form a so-called light grid. The detection sensors enable an immediate and uncomplicated detection of the quantity of hanging adapters, i.e. of a so-called filling level of the detection zone.

A switchable stopping element which is switchable between a blocking position, in which the hanging adapter adjacent to the stopping element is blocked on the conveying rail, and a release position, in which the hanging adapter adjacent to the stopping element is released for conveying from the conveying rail into the conveying system simplifies the feeding of the hanging adapters into the conveying system with the variably settable transport spacing. The stopping element is preferably switchable between a blocking position, in which a hanging adapter adjacent to the stopping element is blocked on the conveying rail, and a release position, in which a hanging adapter adjacent to the stopping element is released for conveying from the conveying rail into the conveying system. The stopping element may cooperate in a reversible contacting manner with the respective hanging adapter. The stopping element is preferably arranged on the conveying rail.

Preferably, the stopping element has at least one stop lock which is displaceable relative to the hanging adapter and/or to the conveying rail for reversibly blocking the hanging adapter. The stop lock may be mounted rotatably and/or linearly displaceably. The at least one stop lock may be mounted such that at least one movement component of a displacement movement between the blocking position and the release position is oriented perpendicularly to the conveying direction of the hanging adapter and/or a longitudinal direction of the conveying rail. Preferably, the integrity of the conveying rail is maintained in the blocking position and the release position. In particular, there is no separation of the conveying rail in the blocking position and in the release position. This makes the apparatus particularly robust and trouble-free in operation.

According to one aspect of the invention, the individualizing unit comprises a drive, in particular a motor. The drive may be configured for displacing the stopping element, in particular between the blocking position and the release position, and/or for driving, in particular for accelerating the hanging adapter along the conveying rail. The drive for displacing the stopping element may be a rotational drive or a linear drive, in particular a fluidic drive, in particular a pneumatic cylinder or a hydraulic cylinder, or an electric drive, in particular an electrically driven spindle drive. For example, the at least one stopping element may be in the form of a wheel with teeth for blocking and/or driving the hanging adapter.

A stopping element arranged on the conveying rail, in particular fastened to the conveying rail, allows immediate blocking and release of a hanging adapter.

A hanging conveying installation comprising the apparatus and a conveying system connected to the apparatus for conveying the hanging adapters substantially has the advantages of the apparatus, reference being hereby made thereto. In particular, the individualizing unit of the apparatus is in signal communication with the conveying system which is conveyingly connected to the apparatus, in particular to the conveying rail. The signal communication may be wired or wireless. This ensures that the hanging adapters can be fed into the conveying system in a simplified and uncomplicated manner.

According to one aspect of the invention, the apparatus is arranged along the conveying direction of the hanging adapters between two branch-free sections, in particular a feeding section and a discharge section, of the conveying system. One or both of the branch-free sections may have conveying drive means, in particular drivers, for driving the hanging adapters along the conveying direction and/or may be designed to be conveying drive-free.

According to one further aspect of the invention, the apparatus may be arranged in the conveying direction upstream and/or downstream of a branch, in particular having a rail switch. In the case of an arrangement in the conveying direction downstream of the branch, the apparatus may be designed for variably setting the transport spacing of the hanging adapters fed via at least two, in particular at least three, switch lines.

A conveying system comprising a conveying means with drivers fastened thereto simplifies the hanging adapters to be carried along with a defined transport spacing. In particular, a plurality of drivers are attached to a conveying means, wherein the drivers can be brought into engagement with a respective hanging adapter. In particular, a conveying chain serves as conveying means, wherein the drivers can in particular be designed as extended chain pins.

An arrangement of the drivers wherein the drivers are arranged with a driver spacing along the conveying means enables a simplified setting of the transport spacing. In particular, the drivers are arranged at a regular driver spacing along the conveying means.

A driver spacing wherein the driver spacing is greater than a length of the hanging adapters oriented along the conveying direction takes into account the finding that it is not necessary to set a driver spacing that is less than a minimum spacing of adjacent hanging adapters. A minimum spacing of adjacent hanging adapters is given when the hanging adapters are in direct contact. The minimum spacing between adjacent hanging adapters defined in this way corresponds to the length of the hanging adapters oriented along the conveying direction. In particular, the driver spacing is at least as large as or larger than the length of a hanging adapter. In particular, the driver spacing is any multiple greater than 1, in particular at least 1.2 times, in particular at least 1.5 times, in particular at least 2 times, in particular at least 3 times the length of the hanging adapters.

A method for feeding transport pockets into a conveying system of a hanging conveying installation, comprising the method steps of conveying hanging adapters while being hanging, each carrying a transport pocket, along a conveying rail which can be coupled conveyingly to the conveying system, detecting the quantity of hanging adapters, arranged within a detection zone on the conveying rail, by means of a detection unit, variable setting a transport spacing for conveying the transport pockets with the conveying system by means of a control unit in signal communication with the detection unit, and singularized feeding of the hanging adapters into the conveying system with the variably set transport spacing by means of a singularizing unit which is in signal communication with the control unit substantially has the advantages of the apparatus, reference being hereby made thereto. Preferably, the hanging conveying installation is configured as described above. The method may be further developed with at least one of the features described above with reference to the apparatus and/or the hanging conveying system. It is essential that the quantity of hanging adapters arranged within the detection zone is detected and, depending thereon, the transport spacing is variably set and the hanging adapters are fed into the conveying system with this variably set transport spacing.

A method wherein the singular feeding of the hanging adapters takes place by switching a switchable stopping element of the singularizing unit from a blocking position, in which the hanging adapter adjacent to the stopping element is blocked on the conveying rail, into a release position in which the hanging adapter adjacent to the stopping element is released for conveying from the conveying rail into the conveying system enables simplified feeding of the hanging adapters into the conveying system.

Both the features specified above and the features specified in the following embodiment of the apparatus according to the invention are suitable in each case on their own or in combination with one another to further develop the subject matter according to the invention. The respective combinations of features do not represent any limitation in terms of the developments of the subject-matter of the invention, but substantially merely have an exemplary character.

Additional features, advantageous embodiments and details of the invention will be apparent from the following description of an exemplary embodiment with reference to the drawing.

DESCRIPTION OF THE PREFERRED EMBODIMENT

Figure 1:
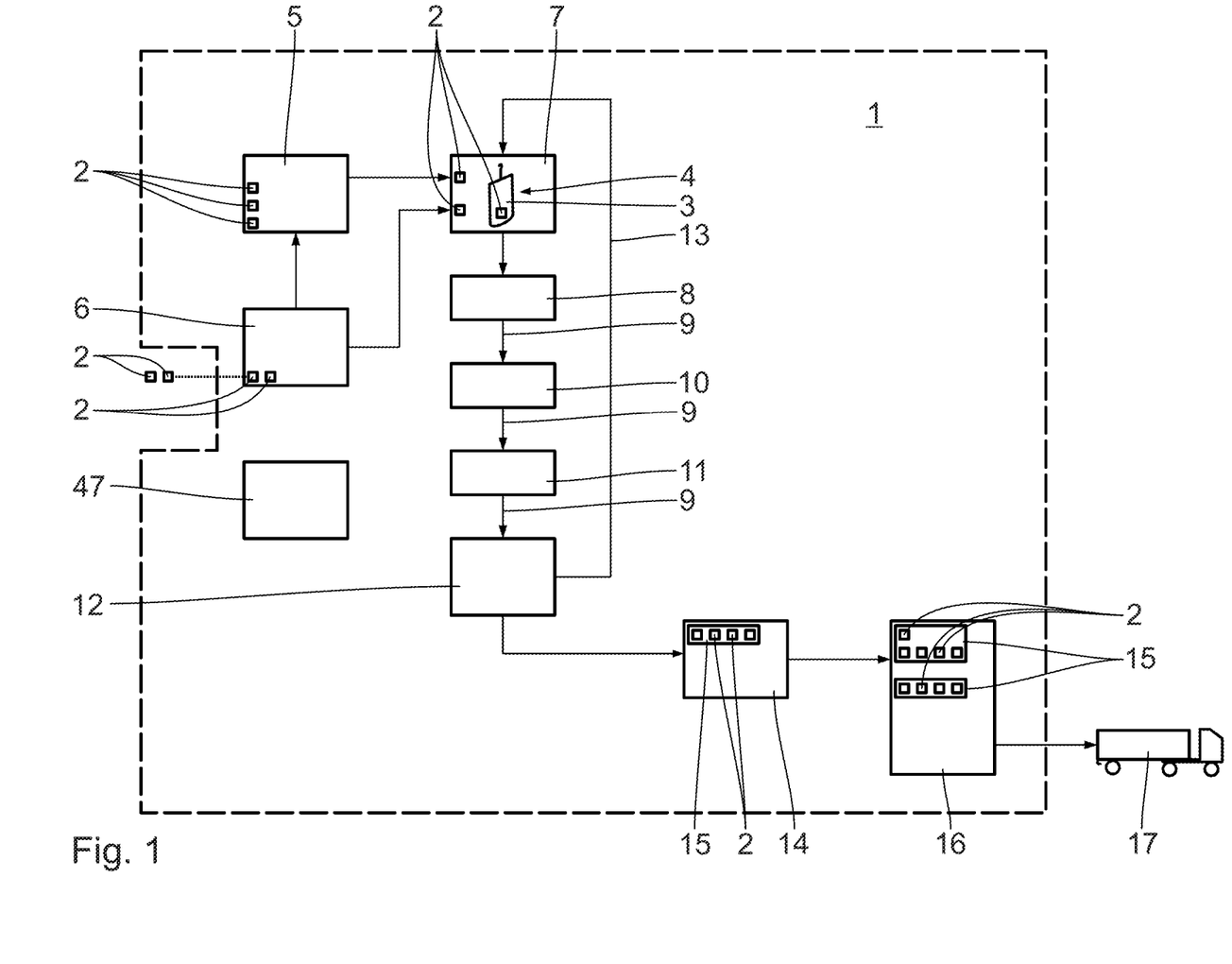
FIG. 1 shows a schematic illustration of a hanging conveying installation.

A hanging conveying installation denoted overall by 1 in FIG. 1 serves for conveying and/or transporting individual articles 2. The individual articles 2 are conveyed in the hanging conveying installation 1, in particular individualized, while being hanging in transport pockets 3. The transport pocket 3 equipped with an individual article 2 forms a hanging conveyable article 4. The individual articles 2 are, for example, items of clothing packed in bags or articles packed in other transport containers, in particular cardboard boxes, from the sector of online commerce, so-called E-commerce.

As a transport means, the hanging conveyable article 4 may alternatively comprise a clothes hanger on which an item of clothing is conveyed hanging.

The hanging conveying installation 1 comprises an article store 5 in which the individual articles 2 are put into storage. The article store 5 can be configured as a manual store or as an automatic store. The hanging conveying installation 1 further has an article inlet 6 via which the individual articles 2 are supplied to the hanging conveying installation 1, in particular from outside. It is also possible for return articles to be supplied to the article inlet 6.

The article inlet 6 is conveyingly connected to the article store 5. The conveying connection is, for example, a conveyor belt or a manual feed of the individual articles 2 to the article store 5, with it in particular also being possible for said individual articles to be present in containers in the article inlet 6.

The hanging conveying installation 1 further comprises at least one loading station 7, at which the individual articles 2 are loaded into the transport pocket 3. The loading station 7 is conveyingly connected both to the article store 5 and to the article inlet 6, in each case independently. The conveying connection allows the individual articles 2 to be conveyed from the article store 5 and/or from the article inlet 6 to the loading station 7. The individual articles can also be conveyed manually to the loading station 7 from the article store 5 and/or the article inlet 6, in particular by means of a spring-bottom trolley or a pallet goods trolley.

The hanging conveying installation 1 comprises an apparatus 8 for feeding hanging conveyable articles 4 into the hanging conveying installation 1. The hanging conveying installation 1 comprises a conveying system 9 for carrying along the fed hanging conveyable articles 4. The apparatus 8 is conveyingly connected to conveying system 9.

The hanging conveying installation 1 comprises an article store 10 for storing, in particular for buffer storing, the hanging conveyable articles 4 in the hanging conveying installation 1.

The hanging conveying installation 1 further comprises a sorting unit 11 which serves for sorting the hanging conveyable articles 4, that is, for changing the order of the hanging conveyable articles 4 in the article flow. The sorting unit 11 can have a plurality of accumulating sections 18 which are arranged in parallel and/or in series and/or one or more revolving circuits. Additionally or alternatively, the sorting unit 11 can be configured as a matrix sorter.

The hanging conveying installation 1 has at least one unloading station 12. A plurality of, in particular three or five, unloading stations 12 can be provided for each sorting unit 11. In particular, each unloading station 12 connected to the sorting unit 11 can be reached by each revolving circuit of the sorting unit 11. In the unloading station 12, the transport pockets 3 loaded with in each case an individual article 2, are opened and unloaded, in particular in an automated manner.

The transport pockets 3 emptied in the unloading station 12 are returned via a return section 13 in the hanging conveying installation 1 and, in particular, are made available to the loading station 7 as empty pockets for reloading with individual articles 2. The emptied transport pockets 3 can also be buffer-stored in an empty pocket store (not shown).

The unloading station 12 is conveyingly connected to at least one packing station 14. At the packing station, the individual articles 2 are packed to form a dispatch-ready order 15. The packing station 14 is conveyingly connected to an article outlet 16. The orders 15 with the individual articles 2 can leave the hanging conveying installation 1 via the article outlet 16. Orders 15 from the article outlet 16 can be transported away by way of external means of transport 17, in particular transport vehicles, in particular lorries.

In the following, the apparatus 8 will be explained in more detail with reference to FIG. 2.

The apparatus 8 comprises an accumulating section 18 having a conveying rail 19, which ensures that the transport pockets 3 are accumulated in the region of the accumulating section 18. Each transport pocket 3 is hung from a respective hanging adapter 24. The hanging adapters 24 are displaceable along the conveying rail 19 in a guided manner. The transport pockets 3 are conveyed along the conveying rail 19 individually and while being hanging. The conveying rail 19 is arranged at an inclination in relastion to the horizontal 20 with an angle of inclination n. In particular, the angle of inclination n is between 1° and 10°. The transport pockets 3 are automatically conveyed along the conveying rail 19 as a result of the inclination by gravitation force. In addition or alternatively, the conveying rail 19 can also have a conveying drive, not shown in FIG. 2, in order to actively convey, i.e. in a driven manner, the transport pockets 3 along the conveying rail 19.

An accumulation of the transport pockets 3 at the accumulating section 18 is ensured by an individualizing unit 21, which comprises a first stopping element 22. The first stopping element 22 is arranged at a downstream end of the conveying rail 19, in particular in the transition region of the conveying rail 19 to the conveying system 9. The first stopping element 22 is oriented in particular transversely and in particular perpendicularly to a conveying direction 23 predetermined by the conveying rail 19. The first stopping element 22 is arranged to be displaceable along a direction transverse and in particular perpendicular to the conveying direction 23 in relation to the conveying rail 19. In the arrangement shown in FIG. 2, the first stopping element 22 is in a blocking position. In the blocking position, the first stopping element 22 is arranged in such a way that a hanging adapter 24 adjacent to the first stopping element 22 is blocked on the conveying rail 19. Conveying of the hanging adapter 24 along the conveying rail 19 is blocked by the first stopping element 22.

The individualizing unit 21 comprises a second stopping element 25, which is substantially configured identically to the first stopping element 22. Analogous to the first stopping element 22, the second stopping element 25 is arranged transversely and in particular perpendicularly in relation to the conveying direction 23 on the conveying rail 19 and is displaceable along a direction transverse and in particular perpendicular to the conveying direction 23 in relation to the conveying rail 19. The second stopping element 25 is arranged at the apparatus in the transition region from the conveying rail 19 to the conveying system 9. In relation to the first stopping element 22, the second stopping element 25 is arranged downstream with respect to the conveying direction 23. In particular, the second stopping element 25 is arranged in relation to the first stopping element 22 spaced apart along the conveying direction 23. The spacing between the stopping elements 22, 25 is at least as large as to allow a hanging adapter 24 to be arranged between the two stopping elements 22, 25 on the conveying rail 19. The spacing between the stopping elements 22, 25 can also be chosen to be so large that a plurality of hanging adapters 24 can be arranged between the stopping elements 22, 25, in particular at least two, in particular at least three, in particular at least four or more hanging adapters 24.

The individualizing unit 21 may also have a rotatable spindle with a worm gear, wherein only one transport pocket 3 is located in each worm gear. By rotating the spindle, the transport pockets 3 are fed individually into the conveying system 9.

In the region of the accumulating section 18, a detection unit 26 is arranged on the conveying rail 19. The detection unit 26 serves to detect the quantity of hanging adapters 24 within a detection zone 27 of the detection unit 26. The detection zone 27 is arranged on the conveying rail 19 and extends in particular along the conveying rail 19.

The detection unit 26 is in signal communication with a control unit 28. The control unit 28 is configured to set a transport spacing $d_T$ for conveying the transport pockets 3 by means of the conveying system 9. The signal communication between the detection unit 26 and the control unit 28 is schematically indicated in FIG. 2 as a cable connection. The signal communication may also be wireless, in particular by means of radio communication and in particular by means of a Bluetooth connection.

The control unit 28 further is in, in particular wired, signal communication, with the individualizing unit 21.

Figure 3:
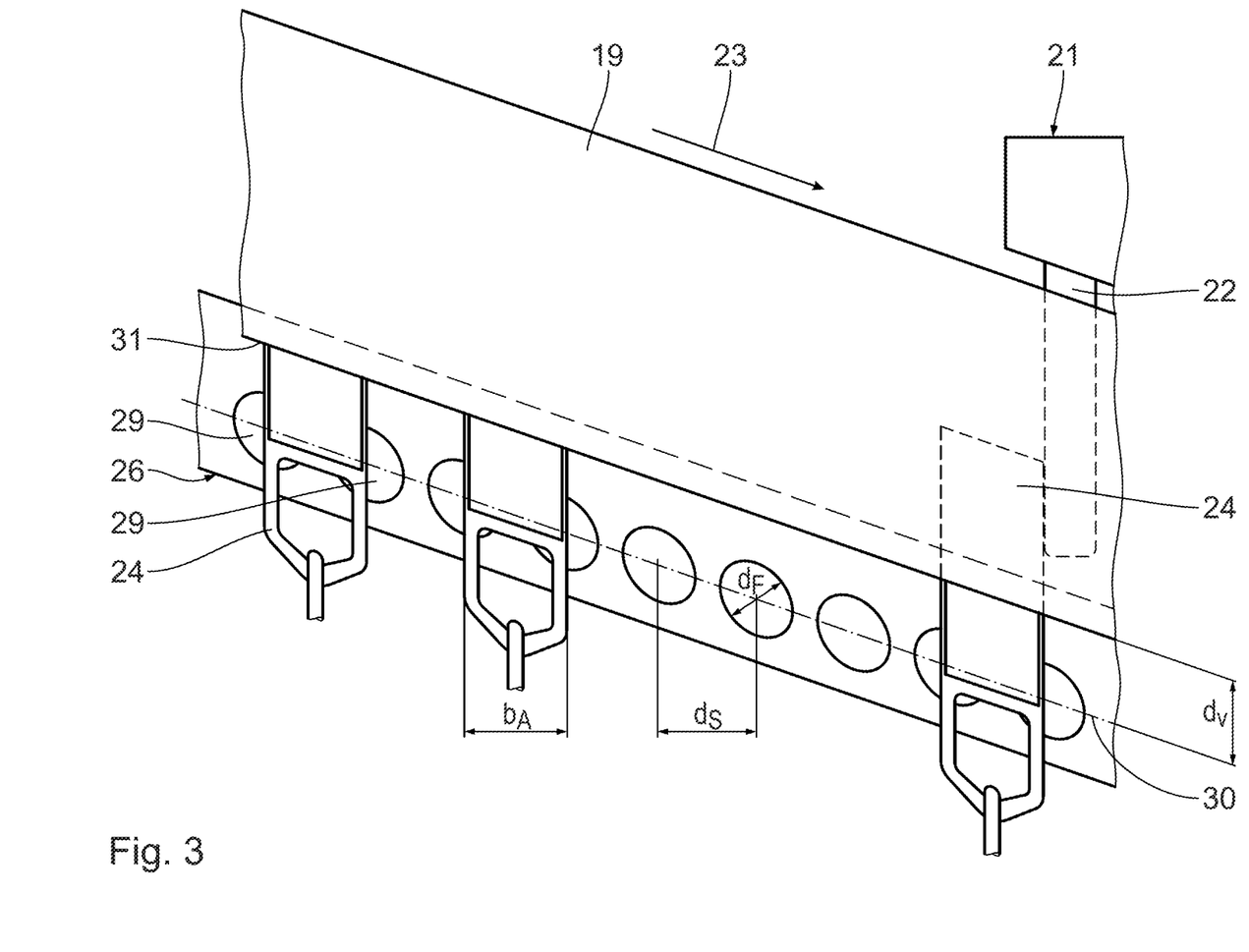
FIG. 3 shows an enlarged detailed view of the apparatus according to FIG. 2 with the detection unit.

In the following, with reference to FIG. 3, the detection unit 26 is explained in more detail.

The detection unit 26 comprises a plurality of detection sensors 29, sixteen according to the embodiment shown. More or fewer than sixteen detection sensors 29 may also be provided in the detection unit 26. The detection sensors 29 are arranged along the conveying rail 19 in a line grid. The line grid has a grid direction 30 oriented to be parallel to the conveying direction 23 of the conveying rail 19.

Along the grid direction 30, the detection sensors 29 are arranged with an, in particular identical, grid spacing $d_S$ to each other. The grid spacing $d_S$ is oriented along the horizontal 20. The grid spacing $d_S$ determines the resolution accuracy of the detection unit 26. According to the shown embodiment example, the grid spacing $d_S$ is in particular defined such that a hanging adapter 24 arranged at any position within the detection zone 27 is reliably detected by a detection sensor 29. The hanging adapters have an adapter width $b_A$ along the conveying direction 23. In particular, $d_S \leq b_A$.

The detection sensors 29 have a sensor surface which, according to the embodiment example shown, is circular in shape. The sensor surface may also have a non-circular shape, in particular a rectangular or square shape. The detection surface has a horizontal extension oriented along the horizontal 20, which has a diameter $d_F$ according to the circular design of the embodiment example. The grid spacing $d_S$ is defined as the center spacing of the sensor surfaces. In particular, $d_S > d_F$.

In particular, $d_S < b_A + d_F$.

The number of detection sensors 29, the grid spacing $d_S$ and the angle of inclination n result in a length $L_E$ of the detection zone 27. The length $L_E$ is oriented along the conveying direction 23.

The detection unit 26 is arranged in relation to the conveying rail 19 and, in particular, is fastened to the conveying rail 19 in such a way that the grid direction 30 extends with a vertical spacing $d_V$ below a lower end 31 of the conveying rail 19. The detection unit 26 is arranged in such a way that the detection sensors 29 reliably detect the hanging adapters 24 projecting downwards from the conveying rail 19.

According to the embodiment example shown, the detection sensors 29 are designed as light barriers with an emitting element and a receiving element. The emitting element emits an optical signal which is received by the corresponding receiving element. If no optical signal is received, this means that an object, i.e. a hanging adapter 24, is arranged between the emitting element and the receiving element.

Alternatively, the detection sensor 29 may comprise an emitting/receiving element and a reflection element. The emitting/receiving element emits an optical signal to the reflection element, which is reflected back from the reflection element to the emitting/receiving element. Accordingly, a hanging adapter 24 is detected here when no reflected signal is detected by the emitting/receiving element.

The detection sensors 29, i.e. the emitting elements and receiving elements or the emitting/receiving elements and the reflection elements, in each case are arranged in pairs on both sides of the conveying rail 19. The hanging adapters are conveyed along the conveying rail 19 between the detection sensors 29 arranged in pairs. The detection sensors 29 form a so-called light grid.

Figure 4:
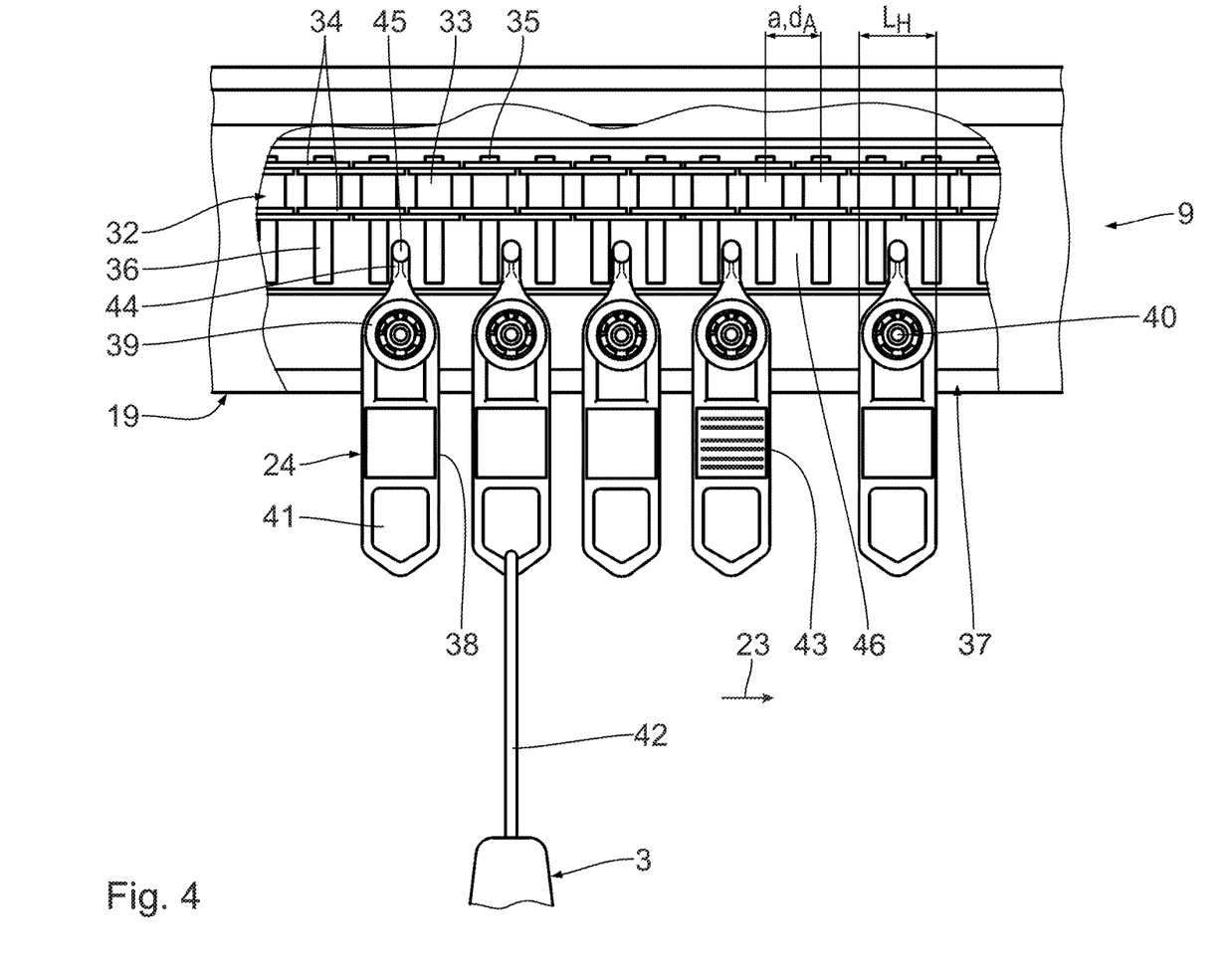
FIG. 4 shows a partially sectioned side view of a conveying system of the hanging conveying installation according to FIG. 2.

In the following, the conveying system 9 is explained in more detail with reference to FIG. 4.

The conveying system 9 of the hanging conveying installation 1 has the conveying rail 19, which can be installed in a space by means of a suitable supporting device. A conveying means 32 in the form of a conveying chain, which can be driven along the conveying direction 23 by means of drive means (not shown), is arranged in the conveying rail 19 which is formed as a hollow-box profile. Furthermore, the hanging adapters 24 are shown, which can be moved in the conveying rail 19 by means of the conveying means 32.

The conveying chain 32 is a so-called roller chain, which has rollers 33 which are connected to one another at a roller spacing a from one another so as to be pivotable by means of connecting links 34 and pins 35. The pins 35 have downwardly projecting pin-shaped extensions which serve as drivers 36. The pins 35 having the drivers 36 extend perpendicularly to the conveying rail 19 in a vertical plane defined by the conveying direction 23.

A center spacing of adjacent drivers 36 in the conveying rail 19 in the conveying direction 23 corresponds exactly to the pitch of the conveying chain 32, that is, to the roller spacing a, and to that extent is invariable and constant. The center spacing of adjacent drivers 36 corresponds to a regular driver spacing $d_A$.

On its underside, the conveying rail 19 has a longitudinal slot 37 which extends in the conveying direction 23. Through the longitudinal slot 37, a flat supporting part 38 of each hanging adapter 24 projects downwardly out of the conveying rail 19. In its upper region, the hanging adapter 24 has, on both sides of the supporting part 38, a respective running roller 39, which is in each case supported on a guide web of the conveying rail, which is not shown in greater detail, and can be displaced thereon in the conveying direction 23. Thus, there is only one pair of common running rollers 39 which are rotatable about a common axis 40. The entire hanging adapter 24 can swing about the axis 40 in the conveying rail 19.

The supporting part 38 at its lower end has a receiving opening 41 into which a hook 42 of the transport pocket 3 can be hanging. It is also possible for a hook 42 of a clothes hanger to be hanging in the receiving opening 41.

Between the receiving opening 41 and the underside of the conveying rail 19, an identification element 43 is arranged on the hanging adapter 24, which may be a transponder, a barcode or a QR code. The identification element 38 extends, corresponding to the arrangement of the plate-like supporting part 38, in the conveying direction 23, that is to say is situated with its main surface open transversely to the conveying direction 23, i.e. towards the side. Therefore, it is thus clearly able to be detected by means of an identification device, such as for example a barcode reader or a transponder reader.

Extending above the running rollers 39 is a stem-like attachment 44 of the hanging adapter 24, which is formed in one piece with the supporting part 38 at the upper end thereof. A stop 45 in the form of a transverse bar is formed at the upper end of the attachment 44. The attachment 44 and the stop 45 have the basic shape of a hammer. The hanging adapter 24 is arranged by way of the attachment 44 and the stop 45 in an interspace 46 formed between two adjacent drivers 36. During a conveying movement of the conveying chain along the conveying direction 23, the hanging adapters are each carried along, i.e. transported, by the driver 36 trailing in the conveying direction 23. The conveying system has a fixed drive.

It is advantageous if the individual articles 2 each have an individual article identification device via which the individual articles 2 are able to be clearly identified. In the case of items of clothing, for example, this can take place on the basis of the manufacturer, the article, the size and/or the color. The identification data of the individual articles 2 can be transmitted by means of signals to a central control unit 47, together with the data stored in the identification element 38 of a hanging adapter 24, and can be combined with one another in terms of data. The individual articles 2 can be uniquely assigned during their transport in the hanging conveying installation 1 by means of correspondingly arranged reading devices along the hanging conveying installation 1, which in particular detect the position of the transport pockets 3. As a result, individualized, targeted conveyance of the individual articles 2 along the hanging conveying installation is possible.

With regard to structural details and further details of the conveying system 9, in particular the conveying rail 19, the conveying means 32 and the hanging adapter 24, reference is expressly made to DE 10 2005 006 455 A1.

In the following, with reference to FIGS. 1 to 4, a method for feeding the transport pockets 3 into the conveying system 9 of the hanging conveying installation 1 will be described in more detail.

Individual articles 2 are supplied to the article inlet 6 and conveyed from there either directly or via the article store 5 to the loading station 7, where in each case a transport pocket 3 is loaded with an, in particular individualized, individual article 2. The transport pockets 3 loaded with individual articles 2 are conveyed from the loading station 7 to the apparatus 8 and accumulated at the accumulating section 18.

The transport pockets 3 arranged accumulated at the accumulating section 18 form a random sample 48 of transport pockets 3. By means of the detection unit 26, the quantity of hanging adapters 24 in the detection zone 27 is detected. The quantity of detected hanging adapters 24, for example five according to FIG. 2, is transmitted to the control unit 28. In addition, the accumulation length $L_S$ of the accumulated transport pockets 3 is transmitted from the detection unit 26 to the control unit 28. The accumulation length $L_S$ is understood to mean the extension along the conveying rail 19 in which the hanging adapters 24 are located. According to the embodiment example shown, the accumulation length $L_S$ is smaller than the longitudinal extension $L_E$ of the detection zone 27. The accumulation length $L_S$ is smaller than or equal to the length $L_E$ of the detection zone 27.

From the accumulation length $L_S$ and the quantity of adapters within the detection zone 27, a mean adapter spacing $d_m$ is calculated in the control unit 28 as the quotient of the accumulation length $L_S$ and the quantity of adapters $N_A$ reduced by 1, i.e. $d_m = L_S : (N_A - 1)$.

In the control unit 28, in dependence on the mean adapter spacing $d_m$, a transport spacing $d_T$ is variably set, with which the transport pockets 3 are fed into the conveying system 9 of the hanging conveying installation 1. In this case, the transport spacing $d_T$ is set in such a way that the transport pockets 3 are conveyed along the conveying system 9 in a manner spaced apart with respect to one another. When being conveyed along the conveying system 9, the transport pockets 3 typically do not touch each other. In particular, the following applies: $d_T > d_m$.

Since the mean adapter spacing $d_m$ is an average value, it is conceivable that the actual adapter spacing of a transport pocket 3 to be fed is greater than the mean adapter spacing $d_m$. In order to avoid contact between the transport pockets 3 in the conveying system 9, the transport spacing $d_T$ is provided with a safety factor $s_F$. In particular, the following applies: $d_T \geq d_m \cdot s_F$, wherein the safety factor $s_F$ in particular is between 1.2 and 5, in particular between 1.5 and 3 and in particular between 2 and 3.

Figure 2:
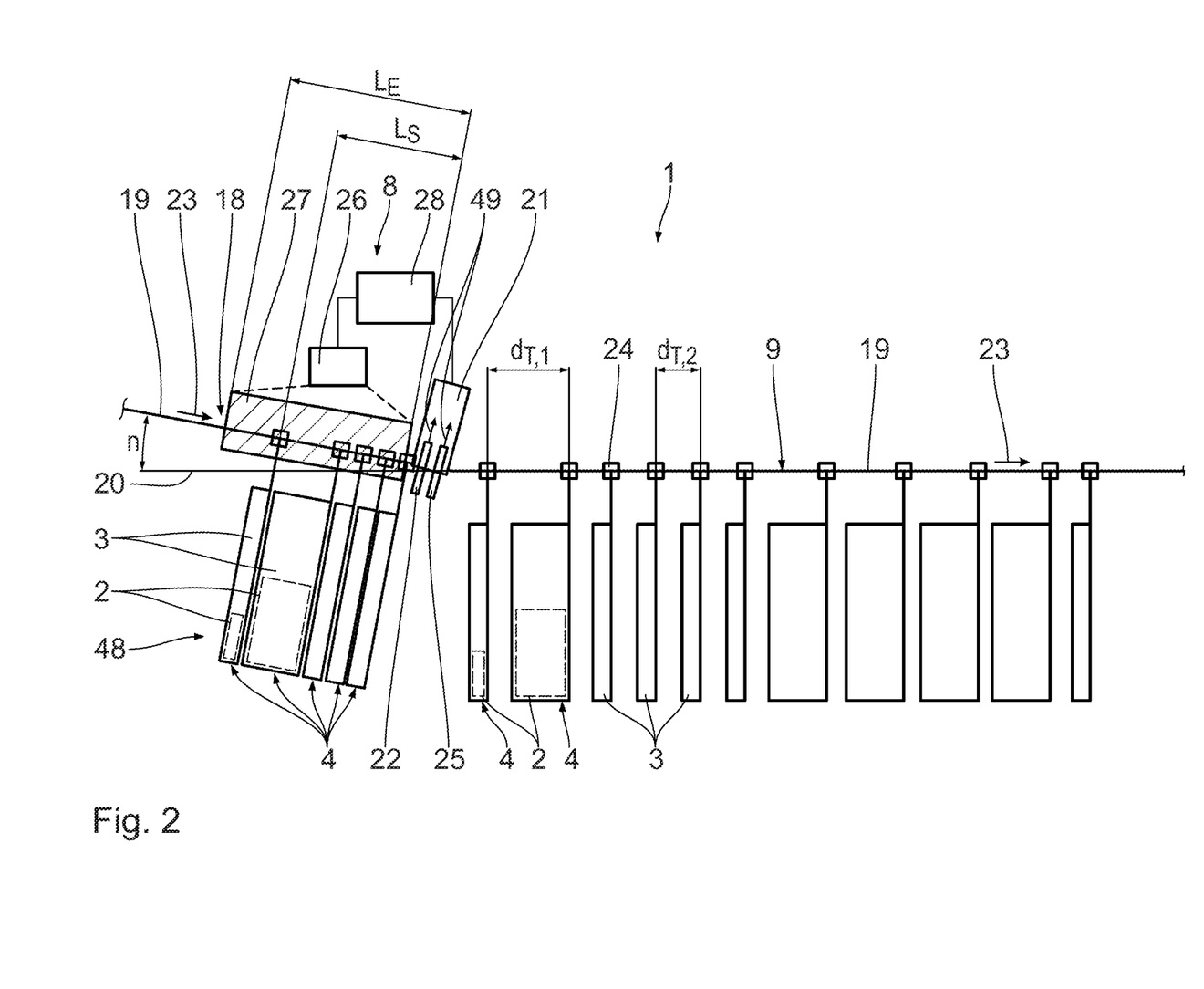
FIG. 2 shows a schematic side view of an apparatus according to the invention in a hanging conveying installation.

The feeding of the transport pockets 3 into the conveying system 9 is carried out by virtue of the fact that the first stopping element 22 is displaced from the blocking position shown in FIG. 2 into a release position. For this purpose, the first stopping element 22 can be actuated along the actuating direction 49 by means of the individualizing unit 21. Due to the inclination of the accumulating section 18, the transport pocket 3, which is arranged adjacent to the first stopping element 22, passes the latter and is stopped at the second stopping element 25, which is in the blocking position. Subsequently, the first stopping element 22 is displaced back into the blocking position. This prevents another transport pocket 3 from passing between the two stopping elements 22, 25. In particular, only one single hanging adapter 24 is arranged between the two stopping elements 22, 25.

After a defined time interval Δt, the second stopping element 25 opens and feeds the transport pocket 3 individually into the conveying system 9. The transport pocket 3, in particular the corresponding hanging adapter 24, is carried along by one of the drivers 36. Depending on the time interval Δt and the speed of the conveying means 32 in the conveying system 9, the respective transport spacing $d_T$ results. As shown in FIG. 2, the transport pockets 3 have different thicknesses depending on the conveyed individual articles 2, resulting in different adapter spacings and thus a different mean adapter spacing $d_m$. Accordingly, different transport spacings $d_{T,1}$, $d_{T,2}$ are set.

In particular, the time interval Δt is determined such that the hanging adapter 24 to be fed into the conveying system 9 is carried along by a selected driver 36.

The variable setting of the transport spacings $d_T$ is carried out in a particularly uncomplicated and reliable manner.

The transport pockets 3 are conveyed along the conveying system 9 with an optimal transport spacing $d_T$. The respective transport spacing $d_{T,i}$ between two adjacent transport pockets 3 is individually adapted. The respective transport spacing $d_{T,i}$ is set in such a way that a collision of adjacent transport pockets 3 and thus a disturbance of the hanging conveying installation 1 is avoided. However, the transport spacing $d_T$ is also small enough to ensure the greatest possible utilization of the conveying capacity of the hanging conveying installation 1.

It is advantageous if the detection unit 26 detects the mean spacings $d_m$ of all transport pockets 3 in the accumulating section 18, transmits them to the control unit 28 and from there the individualizing unit 21 is controlled accordingly. The control unit 28 in particular is designed as a memory-programmable controller and enables an evaluation of the values transmitted by the detection unit 26 for the accumulation length $L_S$ and the quantity $N_A$ of the hanging adapters 24. It is advantageous to take into account historical data when setting the transport spacings $d_T$, in particular to take into account the data of hanging adapters, that is to say their quantity and their accumulation length $L_S$, which were located in the detection zone 27 in a past period of time. This historical data can in particular be combined with currently recorded data.

For example, the historical data include such small mean adapter spacings $d_m$ that would have made it possible to set a transport spacing $d_T$ that is smaller than a required minimum transport spacing. Due to the fact that the minimum transport spacing must not be undershot for installation-related reasons, very thin hanging conveyable articles have been fed with a transport spacing $d_T$ that is larger than would have been necessary. This results in a comparatively reduced conveying density, which can be taken into account when setting the transport spacing $d_T$ on the basis of current data. The consideration takes place in particular in such a way that a transport spacing $d_T$ for a current transport pocket 3 may be selected or set to be smaller than would be required according to an assignment specification used for setting the transport spacing $d_T$.

Due to the consideration of the historical data when processing the current data, the transport spacings $d_T$ may, if necessary, be set smaller than would be necessary on the basis of the setting specification, since the conveyable articles 4 newly fed into the conveying system beforehand have been fed with a low conveying density. The consideration of the historical data is possible in particular as long as an excess of gaps that results from the very thin hanging conveyable articles 4 has been used up by the thicker hanging conveyable articles 4. Combining historical and current data when setting the transport spacing $d_T$ makes it possible for the conveying capacity to be additionally increased. Even when compensating for the excess of gaps, the installation-related minimum transport spacing has to be maintained.

Furthermore, it is advantageous to further process the historical data of the adapter spacings $d_m$. In particular, the historical data of the adapter spacings $d_m$ can be used to determine and/or calculate an exact filling level of a discharge or storage section. In particular, storage units for hanging conveyable articles 4 can be filled more efficiently, since a blanket adoption of an average thickness for all hanging conveyable articles 4 is unnecessary.

The fact that the transport spacing $d_T$ is set individually makes it possible to improve a design of a discharge section of the conveying system 9. For the design, it is possible to use the respectively current, individually set transport spacing $d_T$. A design of the discharge section based on a maximum thickness of the hanging conveyable articles is unnecessary. As a result, the discharge sections can be filled more efficiently, in particular with a higher article density. The risk of overfilling a discharge section is avoided. The area requirement for the discharge section is increased. The investment costs for such a hanging conveying installation are reduced.

The hanging conveyable articles 4 fed into the conveying system 9 are supplied to the article store 10, the sorting unit 11 and the unloading station 12. There, the individual articles 2 are emptied from the transport pocket 3, packed at packing stations 14 to form orders 15 and delivered from the article outlet 16. The emptied transport pockets 3 are returned to the loading station 7 via the return section 13. It is also conceivable for the conveying system 9 to have branch sections, which are not shown, in order to convey the hanging conveyable articles 4 directly past the article store 10 and/or the sorting unit 11.

What is claimed is:

1. An apparatus for feeding transport pockets into a conveying system of a hanging conveying installation, the apparatus comprising:

a conveying rail which can be coupled conveyingly to the conveying system and along which the transport pockets can each be conveyed hanging by means of a hanging adapter;

a detection unit for detecting a quantity of hanging adapters arranged within a detection zone on the conveying rail;

a control unit in signal communication with the detection unit, the control unit being configured to variably set a transport spacing for conveying the transport pockets by means of the conveying system;

a singularizing unit, which is in signal communication with the control unit, for singularized feeding of the hanging adapters into the conveying system at the variably set transport spacing, wherein the detection unit comprises at least one detection sensor for detecting the hanging adapter, the detection unit comprising at least another detection sensor to provide a plurality of detection sensors arranged along the conveying rail in a line grid pattern having a grid spacing which is smaller than or equal to an adapter width of each hanging adapter.

2. The hanging conveying installation according to claim 1, wherein the singularizing unit has a switchable stopping element which is switchable between a blocking position, in which the hanging adapter adjacent to the stopping element is blocked on the conveying rail, and a release position, in which the hanging adapter adjacent to the stopping element is released for conveying from the conveying rail into the conveying system.

3. The hanging conveying installation according to claim 1, wherein a stopping element is arranged on the conveying rail.

4. The hanging conveying installation according to claim 1, wherein a stopping element is fastened to the conveying rail.

5. A hanging conveying installation comprising:
an apparatus according to claim 1.

6. The hanging conveying installation according to claim 5, wherein the conveying system comprises a conveying means with drivers fastened thereto.

7. The hanging conveying installation according to claim 6, wherein the drivers are arranged with a driver spacing along the conveying means.

8. The hanging conveying installation according to claim 7, wherein the driver spacing is greater than a length of the hanging adapters oriented along the conveying direction.

9. The hanging conveying installation according to claim 6, wherein the drivers are arranged with a regular driver spacing along the conveying means.

10. A hanging conveying installation according to claim 5, wherein the variably set transport spacing corresponds to a space between one of the transport pockets located in the conveying system downstream of the singularizing unit and another one of the transport pockets located in the conveying system downstream of the singularizing unit.

11. The hanging conveying installation according to claim 5, wherein the control unit is configured to determine, on the basis of the quantity of hanging adapters, a mean spacing of adjacent hanging adapters, on the basis of which the transport spacing is variably set.

12. The apparatus according to claim 1, wherein the variably set transport spacing corresponds to a space between one of the transport pockets located in the conveying system downstream of the singularizing unit and another one of the transport pockets located in the conveying system downstream of the singularizing unit.

13. The apparatus according to claim 1, wherein the singularizing unit is configured to deliver one hanging adapter at a time into the conveying system.

14. The hanging conveying installation according to claim 1, wherein the detection unit comprises at least one detection sensor for contactlessly detecting the hanging adapter.

15. The apparatus according to claim 1, wherein the at least one detection sensor is designed as an optical sensor or as an RFID sensor.

16. The apparatus according to claim 1, wherein the at least one detection sensor is designed as a light barrier or as an RFID sensor.

* * * * *